June 19, 1945. G. FASSIN 2,378,396
MIRROR PRISM FOR OPTICAL INSTRUMENTS
Filed Feb. 26, 1942
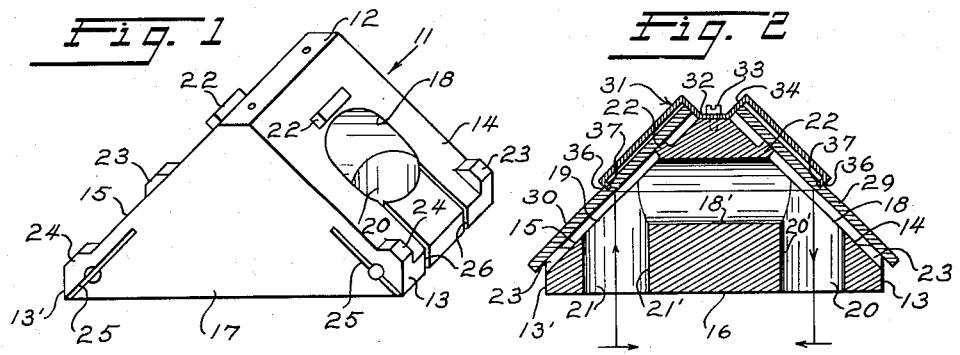
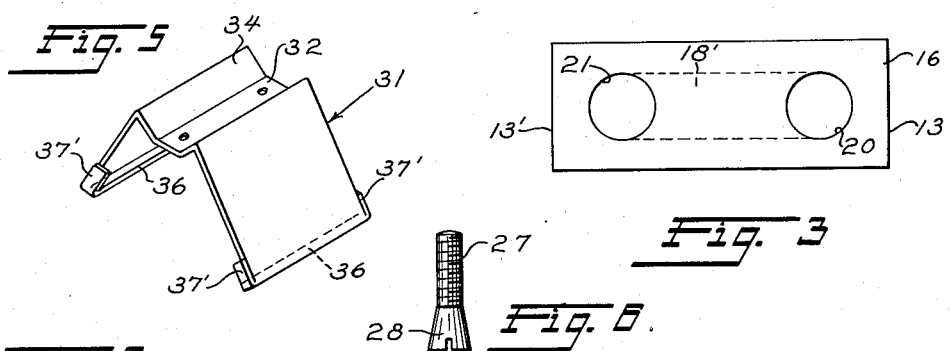
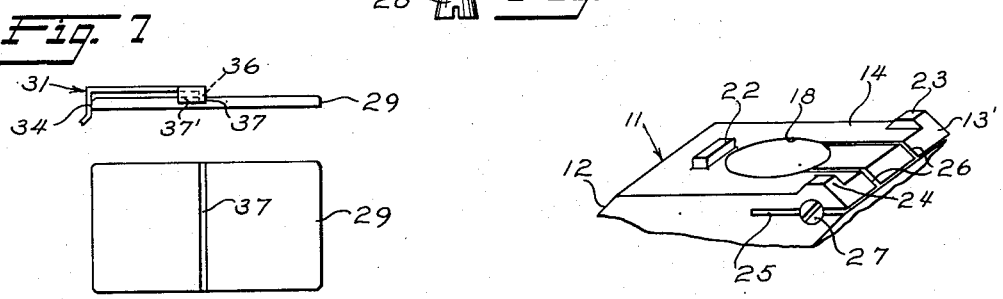
Inventor
Gustave Fassin
By Strauch & Hoffman
Attorneys Patented June 19, 1945

2,378,396

UNITED STATES PATENT OFFICE 2,378,396

MIRROR PRISM FOR OPTICAL INSTRUMENTS

Gustave Fassin, Grosse Pointe, Mich., assignor to Argus, Inc., a corporation of Michigan Application February 26, 1942, Serial No. 432,513

19 Claims. (Cl. 88—74)

This invention relates to light reflecting devices and is more particularly concerned with mirror prism assemblies for use in optical instruments.

Prism telescopes, periscopes and other optical instruments, wherein a relatively long light path is provided within a short casing and wherein accuracy of the angles of reflection of light within the instrument is essential to operation of the instrument, are commonly provided with optical glass prisms. The known glass prism consists of a triangular prismatic block of glass having its base and the two light reflecting sides sloping from the apex opposite the base highly polished and arranged in planes intersecting at predetermined angles.

Preparation of such a glass prism for use in an optical instrument involves careful grinding and polishing of the base and the sloping light reflecting sides so that all three surfaces are exactly planar, smooth and highly polished, and are arranged at the correct angles to each other. In such prisms, the triangular end faces are usually frosted or otherwise roughened to avoid unwanted internal reflections.

The operations of grinding and polishing these hard glass prism surfaces to correct shape and angularity are very painstaking and expensive, and unless expert workmen are employed a great deal of time and optical glass may be wasted. An inaccurate grinding operation usually represents waste, and optical glass is a difficult and expensive work material.

It has been suggested heretofore to substitute suitably angularly arranged plane reflectors for the known glass prisms, but to my knowledge such has never been done in practical and accurate optical instruments. This is chiefly due to difficulties encountered in positioning and maintaining the plane reflectors in correct relative angularity. In glass prisms, this problem is not present as the reflecting surfaces are permanently arranged once they are ground, which is the main reason they have been universally employed. My present invention solves this problem by providing a novel device for accurately locating and reliably holding planar reflectors without deformation at selected angles during the life of the instrument. My mirror prism assembly is designed as an inexpensive substitute or replacement for the more expensive optical glass block prism in optical instruments.

In consideration of the above it is a major object of my invention to provide an inexpensive mirror prism assembly of novel construction which is functionally the full equivalent of an accurately ground optical glass prism when used in optical instruments.

It is a further object of the invention to provide a mirror prism assembly wherein angularly disposed planar reflectors are mounted, positioned and maintained in desired angular relation upon a novel support. Preferably this support comprises an integral or otherwise rigid block of metal or similar material.

A further object of the invention is to provide a mirror prism assembly wherein planar reflectors are supported upon a relatively rigid frame in desired angular relation and novel arrangements are provided for adjusting angularity of one or both mirrors.

It is a further object of the invention to provide a novel mirror prism assembly wherein a rigid skeleton frame supports a pair of planar reflectors at desired angular relation and a special resilient clip is provided for reliably securing the mirrors on the support without deformation.

Further objects of the invention will presently appear as the description proceeds in connection with the appended claims and the annexed drawing in which:

Figure 1 is a perspective view illustrating the skeletonized prismatic block employed to hold the reflectors in a preferred embodiment of the invention;

Figure 2 is a section through the middle of the skeleton block of Figure 1 illustrating the light path through the block, the reflectors in correct position, and my special clip for holding the reflectors on the block;

Figure 3 is a plan view looking upwardly at the base of the block illustrating the apertures in the base for entrance and exit of the light rays;

Figure 4 is an enlarged perspective view illustrating the reflector seating arrangements on one side of the block and preferred provisions for adjustment of reflector angularity;

Figure 5 is a perspective view of the special resilient clip for holding both reflectors on the block;

Figure 6 illustrates the tapered-head screw used for reflector adjustment in the embodiment of Figure 4;

Figure 7 is a side elevation illustrating cooperation of each reflector with the supporting clip;

Figure 8 is a view of the back of each reflector illustrating saw cut slots for cooperation with the clip; and Figure 9 is an elevation partly in section of a further embodiment of the invention wherein special screws are provided for reflector support and adjustment.

Referring to Figures 1-4, my mirror prism assembly comprises a triangular prismatic block 11 which in the illustrated embodiment is in the form of a right angle prism. The prism is preferably an integral opaque block of light-weight metal such as aluminum which is die-cast or cut to shape and truncated at the apex and the corners between the inclined sides and the base to provide accurately flat narrow seats 12, 13 and 13'.

Block 11 is bounded by inclined side walls 14 and 15 at opposite sides of the apex, a base 16 opposite the apex, and triangular end walls one of which is indicated at 17 in Figure 1. Walls 14 and 15 are of such slope as to intersect at approximately the desired apex angle. Walls 14 and 15 are formed with aligned substantially centrally located apertures 18 and 19, respectively, of suitable size which are interconnected by a passage 18' through the block. Apertures 18 and 19 are connected to spaced apertures 20 and 21 in base 16 by passages 20' and 21' in the block extending at right angles to passage 18'. This provides a generally U-shaped light path within the block which is substantially skeletonized by the passages. Passages 18', 20' and 21' are cast or cut into block 11 as desired, and are preferably sharply corrugated to avoid internal light reflections.

Referring to Figure 4, reflector supporting side wall 14 of the block is provided with three spaced abutments 22, 23 and 24 which are preferably integral with wall 14 and are formed with planar top surfaces all lying in the same plane. Abutment 22 is centrally located on wall 14 between the axis of aperture 18 and the apex. Abutments 23 and 24 lie at the opposite lower corners of wall 14, and the material of the block adjacent each of abutments 23 and 24 is weakened as by saw cut slots 25 and 26 extending respectively parallel and normal to the plane containing the top surfaces of the abutments. Slot 25 is tapped sufficiently deep to provide a threaded hole for receiving a screw 27 having a tapered head 28 which is adapted to enter slot 25 as a wedge when advanced, and thereby cause displacement of that corner of the block which carries abutment 24 in a direction generally normal to the plane containing the top surfaces of the abutments. A similar screw is provided for independent adjustment of abutment 23 at the other corner of wall 14. The material of the block is of sufficient resiliency to effect reverse displacement of the abutments when the screw wedges are retracted from slots 25. The purpose of this adjustment will be explained later.

Oppositely sloping wall 15 is otherwise substantially identical with wall 14. Wall 15 is formed with integral abutments having the same shape, size and location as abutments 22, 23 and 24 on wall 14 and having planar top surfaces all lying in the same plane. The corner abutments on wall 15, corresponding to abutments 23 and 24 of wall 14, are similarly mounted on independently adjustable weakened sections of the block.

The planes containing the top table surfaces of the sets of abutments on walls 14 and 15, respectively, intersect at precisely the angle selected for the prism apex, and this is 90° in the illustrated embodiment. Since metal is easy to machine and work, the operation of correctly and accurately forming these table surfaces is easy and inexpensive.

Opposed reflectors 29 and 30 are supported by the abutments on walls 14 and 15, respectively, overlying apertures 18 and 19. Reflectors 29 and 30 are first-surface mirrors which are preferably rigid metal plates coated with a suitable highly reflective material such as chromium, silver, aluminum, tantalum or the like, or may be any highly reflective first-surface reflectors. It is essential only that the reflecting surface of the mirrors resting on the abutments be absolutely plane so as to seat evenly on the planar top surfaces of the abutments. This arrangement locates the reflecting surfaces at the desired angles relative to each other and the light path.

Reflectors 29 and 30 are releasably secured upon the abutments by the special resilient clip 31 illustrated in Figure 5. Clip 31 preferably comprises an integral strip of springy sheet steel having an intermediate flat bridge 32 adapted to fit with apex seat 12 of the block and be secured thereto as by cap screws 33. On opposite sides of bridge 32, the clip is permanently bent outwardly to form narrow upwardly inclined walls 34 against which the upper edges of the reflectors abut. Each leg 35 of the clip inclines from wall 34 downwardly parallel to its associated reflector and terminates in an inturned narrow lip 36 which fits snugly into a lateral slot 37 made as by a saw cut in the back of the reflector. At the opposite ends of each lip 36, inwardly bent integral tabs 37', embrace opposite side edges of the associated reflector when the clip is in place, as in Figures 2 and 7.

The material of clip 31 may be of such resiliency that the reflectors may be mounted on the abutments after the clip has been secured to the block by screws 33. This is accomplished simply by lifting either resilient leg of the clip until the associated reflector can be slidably inserted upwardly beneath it until the upper edge of the reflector abuts against wall 34, and then releasing the clip leg to permit lip 36 to spring into slot 37. The resiliency of clip 31 spring presses each reflector tightly onto its seat. Each reflector edge cooperates with associated wall 34 and lip 36 with slot 37 to prevent movement of the reflector in its plane toward or away from the apex, whereas tabs 37' prevent movement of the reflector in a plane parallel to its reflecting surface.

Due to the above arrangement either reflector may be easily independently removed or replaced, should it become tarnished or injured.

In manufacturing my mirror prism, the initial stages of manufacture of the slots are relatively rough as the block may be die-cast or easily cut to approximately the shape of Figure 1. The most important initial step is to insure that the abutment seats on walls 14 and 15 lie in the desired planes and are of such height as to provide the correct light path length. In the illustrated embodiment I show a 90° prism wherein the sets of planar abutment surfaces are disposed at 90°, but it will be understood that prisms of any other desired apex angle are within the scope of the invention.

After the passages, apertures and abutment faces of block 11 have been satisfactorily prepared, mirrors 29 and 30 are clipped into place as shown in Figure 2. This operation locates the mirrors in approximately correct angular relation. The mirrors are then adjusted into exact relative angularity by manipulation of screws 27 to effect independent displacement of the mirror corners. This adjustment is very delicate and fine as small displacements in the mirrors cause amplified image displacements. Once the adjustment is obtained, however, it may be permanently maintained as by sealing screws 27.

Adjustment of abutments 23 and 24 in the same direction and the same amount alters the 90° angle between mirrors 29 and 30. Adjustment of abutments 23 and 24 relative to each other corrects the pyramidal error between the mirrors.

In the embodiment of my invention illustrated in Figure 9, the reflectors are supported as in Figure 2 by top abutment 22, but the lower abutments are eliminated and replaced by four screws 40 adjustably threaded in tapped holes 41 at each corner of the block. Each screw 40 has a rounded head 42 engaging and supporting the planar inner surface of the associated reflector.

This arrangement eliminates the work of accurately surfacing abutments 23 and 24 of Figure 1 and lining these abutments up with abutment 22, and has proved satisfactory. Independent adjustment is effected at the lower corner of each reflector by turning screws 40 with a screw driver, and the adjustments may be sealed by sealing wax filling holes 41 above the screw heads. Otherwise, the assembly of Figure 9 is the same as Figure 2.

The mirror prism assembly of my invention is inexpensive to make and easy to assemble, since the operations are mainly metal-working. No glass grinding and polishing is necessary. The reflecting surfaces are on rigid plates which are not readily deformed and are easily held in correct operative position on a rigid skeleton frame which permits passage of the image light rays but is otherwise opaque.

The reflectors are speedily placed in the correct location, once the block assembly has been accurately and reliably adjusted to final position. The reflectors may be readjusted or removed as desired, or as may be necessary.

The mirror prism assembly may be mounted in the casing of the optical instrument in which it is to be used by cages or other devices similar to those used for mounting glass prisms. However, my prism assembly is much easier to mount in an instrument than a glass prism because my assembly has a number of available attachment surfaces such as sides 17 not possible in a glass prism.

I have discovered my prism assembly to constitute a more efficient reflector than the usual glass prism, since I eliminate the entrant and exit glass surfaces and frosted side walls of such glass prisms. This results in better image contrast when my invention is used in an optical instrument.

The invention may be embodied in other specific forms without departing from the spirit or esential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A mirror prism assembly comprising a rigid support, means providing a pair of plane reflecting surfaces on said support facing each other and arranged at an angle, and means on said support for adjusting the relative angularity of said surfaces, said support comprising an opaque block having light passages leading to and between said reflecting surfaces.

2. In a reflector assembly, a support having a light admitting aperture, a plurality of spaced projections of substantially uniform height on said support adjacent said aperture, a reflector having a plane reflecting surface resting on said projections and overlying said aperture, and means for altering the height of at least one of said projections for adjusting the angularity of said reflector, said means comprising a deformable finger on said support carrying said one projection, and means for deforming said finger so as to displace the projection thereon in a direction substantially normal to said reflecting surface.

3. A mirror prism assembly comprising a support having a wall formed with a light aperture, a plurality of projections on said wall spaced about said aperture and having flat top surfaces all lying in a plane disposed at an angle to the axis of said aperture, a plane reflector resting on said surfaces and overlying said aperture, means resiliently holding said reflector on said projections and cooperating means on said resilient holding means and said reflector for preventing displacement of said reflector in its plane in any direction.

4. A mirror prism assembly comprising a support having a wall formed with an aperture, a plurality of integral projections on said wall spaced about said aperture and having flat top surfaces lying in a plane disposed at an angle to the axis of said aperture, a plane reflector resting on said surfaces and overlying said aperture, the section of said wall supporting one of said projections being deformable in a direction normal to said plane, means for displacing said section to adjust the projection carried thereby, and means holding said reflector on said projections.

5. In a reflector assembly, a block having a light passage terminating in an aperture, three spaced projections of substantially uniform height on said block arranged about said aperture, a plane reflector having its reflecting surface resting on said projections and overlying said aperture, and means for adjusting the height of two of said projections for changing the angularity of said reflector.

6. In a reflector assembly, a block having a light passage terminating in an aperture, three spaced projections of substantially uniform height on said block arranged about said aperture, a plane reflector having its reflecting surface resting on said projections and overlying said aperture, means for adjusting the height of two of said projections for changing the angularity of said reflector, and resilient means for constantly maintaining said reflector in tightly seating engagement with all of said projections in all adjusted positions of said reflector.

7. A reflector assembly comprising a support having a plurality of spaced projections of uniform height, a plane reflector having its reflecting surface resting on said projections, spring means holding said reflector against all of said projections, means for adjustably displacing at least one of said projections in a direction substantially normal to the plane of said reflector and means carried by said spring means for preventing displacement of said reflector over the faces of said projections in all adjusted positions of said reflector.

8. In a reflector assembly, a support provided with a plurality of spaced projections having flat abutment faces disposed in a common plane, a plane reflector having its plane reflecting surface seating upon said abutment faces, said reflector having a pair of parallel spaced shoulders on its rear face, a spring anchored to said support and having a portion seating against the rear face of said reflector between said shoulders, the latter being so located with respect to said projections as to cause said spring to constantly urge said reflector into engagement with all of said abutment faces with substantially uniform pressures; and means on said spring, cooperating in abutting relationship with said reflector, for restraining the latter against displacement in a direction parallel to said shoulders.

9. The reflector assembly defined in claim 8, wherein said shoulders comprise the side walls of a groove provided in the rear face of said reflector and snugly cooperate with a down-turned portion of said spring.

10. In a reflector assembly, a body member of generally triangular shape in cross-section having a pair of upwardly slanting side walls and a base, said body having a light passage disposed parallel to said base and terminating at each end in an aperture in said slanting side walls; a pair of spaced light passages intersecting said first-named light passage where it opens onto the slanting side walls of said body; a plurality of projections on said slanting walls arranged around each of said apertures, said projections being of substantially uniform height and having flat top surfaces; a plane reflector overlying each of said apertures and having its plane reflecting surface seating upon the tops of said projections; and means, anchored to said support and bearing against the rear surfaces of said reflectors, for maintaining the latter in place on said projections.

11. The reflector assembly defined in claim 10, wherein said means comprises a single resilient member anchored intermediate its ends to said body adjacent the upper ends of said slanting walls and having arms inclining downwardly and overlying the rear faces of said reflectors and engaging the latter intermediate their ends.

12. The reflector assembly defined in claim 10, wherein said body, adjacent at least one of said projections, is provided with a slot underlying said one projection, so as to render the portion of said body carrying said projection capable of deflection in a direction substantially normal to the plane of its slanting wall, and means associated with said slot for effecting predetermined degrees of deflection of said portion of said body, to thereby vary the angularity of said reflector.

13. In a reflector assembly, a support having a light admitting aperture, a plurality of spaced projections of substantially uniform height on said support adjacent said aperture, a reflector having a plane reflecting surface resting on said projections and overlying said aperture, and means for altering the height of at least one of said projections for adjusting the angularity of said reflector, said means comprising an adjustable threaded member carrying one of said projections and operable to displace said one projection in a direction substantially normal to said reflecting surface.

14. A reflector assembly comprising a support providing a plurality of projections having flat abutment faces disposed in a common plane, a plane reflector having its plane reflecting surface seating upon said abutment faces, and a single means for constantly resiliently urging said reflector into engagement with said abutments comprising a spring anchored to said support and engaging the rear face of said reflector, said spring comprising a blade-like portion seating in a recess in said rear face of said reflector and operable to prevent displacement thereof in one direction across said abutment faces.

15. A reflector assembly comprising a support providing a plurality of projections having flat abutment faces disposed in a common plane, a plane reflector having its plane reflecting surface seating upon said abutment faces, and a single means for constantly resiliently urging said reflector into engagement with said abutments comprising a spring anchored to said support and engaging the rear face of said reflector, said spring being provided with means for precluding displacement of said reflector in the plane thereof over the abutment faces of said projections.

16. A reflector assembly comprising a support having a plurality of spaced projections formed with abutment faces disposed in a common plane, a first surface plane reflector having its plane reflecting surface seated upon said abutment faces, and means for resiliently locating and holding said reflector on said abutments comprising a spring anchored at one part to said support and cooperating interfitting parts on said reflector and spring for preventing undesired displacement of said reflector in a plane parallel to its reflecting surface.

17. A reflector assembly comprising a support provided with a plurality of spaced deformable portions each carrying a projection formed with a flat abutment face, said faces lying in a common plane, a plane reflector mounted with its plane reflecting surface resting on said abutment faces, means for holding said reflector seated on said abutment faces, and means for independently deforming each of said portions so as to displace the abutment face carried thereby substantially normal to said reflecting surface, for angularly adjusting said reflector.

18. In a reflector assembly, a support having a deformable portion carrying a projection formed with a flat abutment face, a plane reflector having its plane reflecting surface resting on said face, means for controllably deforming said portion so as to displace said abutment face in a direction substantially normal to said face, and means urging said reflector against said face during all conditions of said adjustment.

19. In a reflector assembly, a support formed with an aperture and having a pair of spaced deformable sections carrying projections formed with flat abutment faces, a third spaced projection on said support formed with a flat abutment face, all of said projections being disposed adjacent said aperture and said abutment faces all lying in substantially a common plane, a reflector having a plane reflecting surface resting on said faces, means for holding said reflector on said support, and means for independently deforming each of said sections so as to displace the associated projection substantially normal to said reflecting surface.

GUSTAVE FASSIN.